United States Patent
Boatright et al.

(10) Patent No.: US 7,898,988 B2
(45) Date of Patent: Mar. 1, 2011

(54) SELF ANNEALING AUTO-EXPANDING NETWORK

(75) Inventors: Robert Boatright, Sandy, UT (US); Richard Kreifeldt, South Jordan, UT (US); Craig Gunther, Salt Lake City, UT (US)

(73) Assignee: Harman International Industries, Incorporated, Northridge, CA (US)

(*) Notice: Subject to any disclaimer, the term of this patent is extended or adjusted under 35 U.S.C. 154(b) by 797 days.

(21) Appl. No.: 11/385,635

(22) Filed: Mar. 21, 2006

(65) Prior Publication Data

US 2007/0171937 A1    Jul. 26, 2007

Related U.S. Application Data

(60) Provisional application No. 60/760,666, filed on Jan. 20, 2006.

(51) Int. Cl.
*H04L 12/28* (2006.01)

(52) U.S. Cl. ......................................................... 370/258

(58) Field of Classification Search .................. 370/223, 370/224, 258, 465
See application file for complete search history.

(56) References Cited

U.S. PATENT DOCUMENTS

| 5,150,356 | A  | * | 9/1992  | Tsutsui ........................... 370/223 |
| 5,694,547 | A  | * | 12/1997 | Subramanian et al. ....... 709/224 |
| 6,262,993 | B1 | * | 7/2001  | Kirmse ........................... 370/463 |
| 6,278,690 | B1 | * | 8/2001  | Herrmann et al. ............. 370/224 |
| 7,151,742 | B1 | * | 12/2006 | Meyer ............................ 370/224 |
| 2002/0094035 | A1 | * | 7/2002 | Okada et al. .................... 375/295 |

FOREIGN PATENT DOCUMENTS

GB            2 152 789 A        8/1985

* cited by examiner

*Primary Examiner* — Derrick W Ferris
*Assistant Examiner* — Mohammad Anwar
(74) *Attorney, Agent, or Firm* — Brinks Hofer Gilson & Lione

(57) ABSTRACT

A ring based network includes a first circuit and a second circuit. The first circuit selects one of a number of inputs and switches an input to a first common communication line. A second circuit selects one of a second number of inputs and switches a second input to a second common communication line linked to one of the first number of inputs. A detect circuit controls the switches of the first and second circuit to emulate a communication ring in which nodes are connected in series in a communication loop.

20 Claims, 9 Drawing Sheets

SELF ANNEALING AUTO-EXPANDING NETWORK

PRIORITY CLAIM

This application claims the benefit of priority from U.S. Provisional Application No. 60/760,666, filed Jan. 20, 2006, which is incorporated herein by reference.

BACKGROUND OF THE INVENTION

1. Technical Field

The invention relates to networks, and more particularly, to a system that connects two or more devices.

2. Related Art

Networks allow computers to communicate. Networks sometimes establish a cohesive architecture that allows different equipment to transfer information in a near-seamless fashion. There are several ways to physically connect computers including daisy chain and ring topologies.

A daisy chain connects devices in series. To minimize conflicting communication requests; each device in some daisy chains may be given a different priority, in other daisy chains a device may monitor a communication channel and transmit when an exchange ends. In a ring network devices are connected in a closed loop or a ring. Messages are passed around the ring from one node to the next in one direction. When a node receives a message it examines the destination address attached to the message and accepts it or passes the message to the next node.

While the continuous passing of messages allow some ring networks to cover large distances, adding new nodes or devices to a ring network may be difficult. To add a new or additional device, that device must be inserted between existing devices that may require a connection to cables and devices that are concealed. A break in the ring will also bring down the entire ring network. Therefore, there is a need for an architecture that simplifies reconfiguring networks. There is also a need for a ring architecture that may bypass a failing node.

SUMMARY

A ring based network comprises a first circuit and a second circuit. The first circuit selects one of a number of inputs and switches an input to a first common communication line. A second circuit selects one of a second number of inputs and switches a second input to a second common communication line linked to one of the first number of inputs. A detect circuit controls the switches of the first and second circuit to emulate a communication ring in which nodes are connected in series in a communication loop.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Connections within a closed loop or a ring network may be made in series or through a daisy chain through an interface adapter. The interface adapter may form a closed loop or a ring topology by connecting nodes in series using a communication channel. In this system adding a new node to a closed loop or ring topology may be simplified. Instead of breaking the loop or ring to insert a new node, which may bring down the closed loop or ring network, a new node may be added onto the last node of the loop or ring network like a daisy chain without interrupting information flow. In some systems, a new node may be added to the network through a media or channel that links the output port of the last node with the input port of the new node. In these systems there is no need to physically connect the output of the last node of a network to the input of a first node of the network. If a connection completes the ring by connecting the output of the last node to the input of the first node, a redundant path may be created that may minimize the harmful effects of a failed node or a failed communication link.

Figure 1:
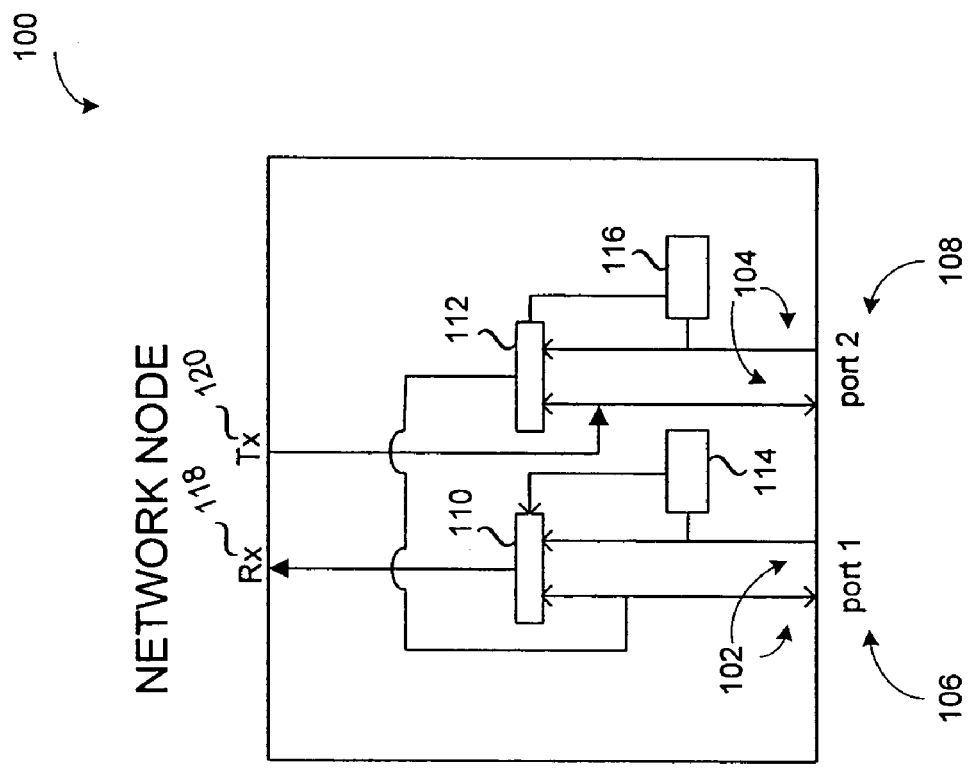
FIG. 1 is a block diagram of an interface adapter.

FIG. 1 is a block diagram of an interface adapter 100. The interface adapter 100 includes multiple ports in which data may be transferred between an input device and output device. In a two port connection, two sets of inputs 102 and 104 are connected to a first port 106 and a second port 108, respectively. Each set includes an input dedicated to receiving data (e.g., as an input) from a port and an input/output (an I/O) that may send and receive data (e.g., bidirectional flow) from a port.

Interleaving devices or selectors 110 and 112 select an output from a number of inputs or I/Os. Under the control of first and second detecting devices 114 and 116, data flows from the first or second port 106 or 108 to a first network input (e.g., $R_x$) 118. Data may then be transmitted from a first network output (e.g., $T_x$) 120 to the first or second port 106 or 108. If data is to flow to the first port 106, the second detecting device 116 selects the I/O and forwards the first network output 120 to the first port 106 through the second interleaving device or selector 112. If data is to flow to the second port 108, data flows from the first network output 120 to the second port 108. By these selections, data may flow in a closed loop or ring even though devices are physically connected in series or a daisy chain.

The interface adapters 100 of FIGS. 1-9 may automatically detect when a device is connected to the first or second port 106 and 108. The first and second detecting devices 114 and 116 may detect connections. Some detecting devices may test continuity, some may validate signals or data and others may a apply plug and play logic that allows the network to communicate with an added peripheral without a manual configuration. The first and second detecting devices 114 and 116 may detect the relative position of a port to another port and adjust internal data routing to maintain communication flow.

Figure 2:
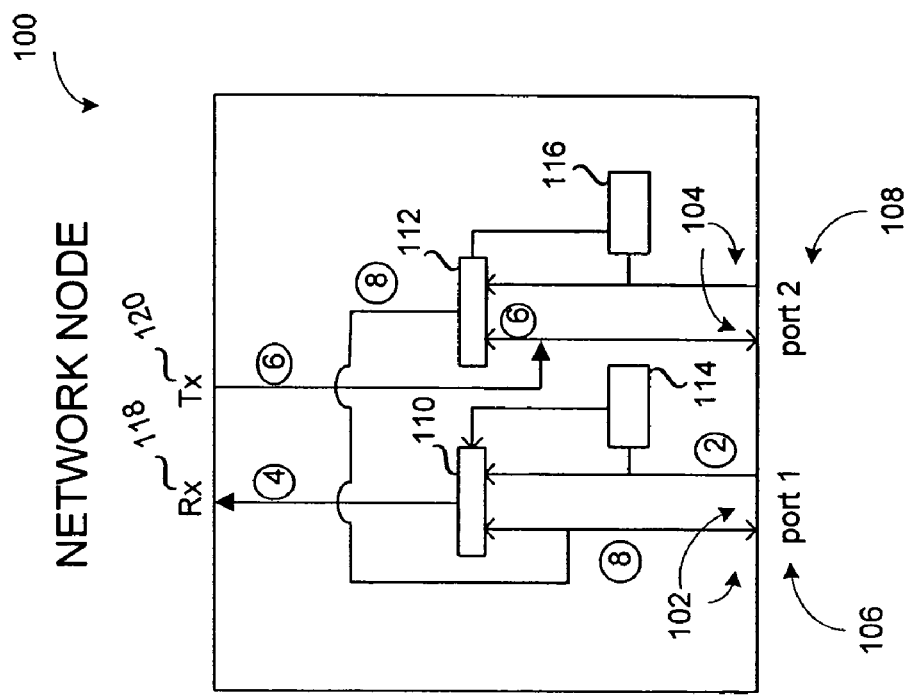
FIG. 2 is a second block diagram of the interface adapter of FIG. 1.

FIG. 2 is a second block diagram of the interface adapter 100. When coupled to first and second ports 106 and 108 data may flow in one or more directions. When a message is received at the first port 106 it passes through the first interleaving device or selector 110 to the first network input 118 (e.g., $R_x$) (from ② to ④). When the first network input 118 receives the message, it examines the destination address attached to the message. If the address is the same as the first network input 118, the first network input 118 accepts the message and releases the network. Otherwise, the message is passed to or regenerated and passed to the second port 108 (⑥) where it is accepted or passed on. If there is a failure at the second port 108 or the port is not connected, the message may be returned to the first port 106, which may then be passed on through an alternative path. In this state, the message passes through the second interleaving device or selector 112 to the first port 106 (from (⑥ to ⑧)) through the control of the second detecting device 116. In FIG. 2, the second detecting device 116 may comprise an automatic signal detector or a signal validation (e.g., a circuit or logic such as software) that selects the message (e.g., the signal received through the I/O).

Figure 3:
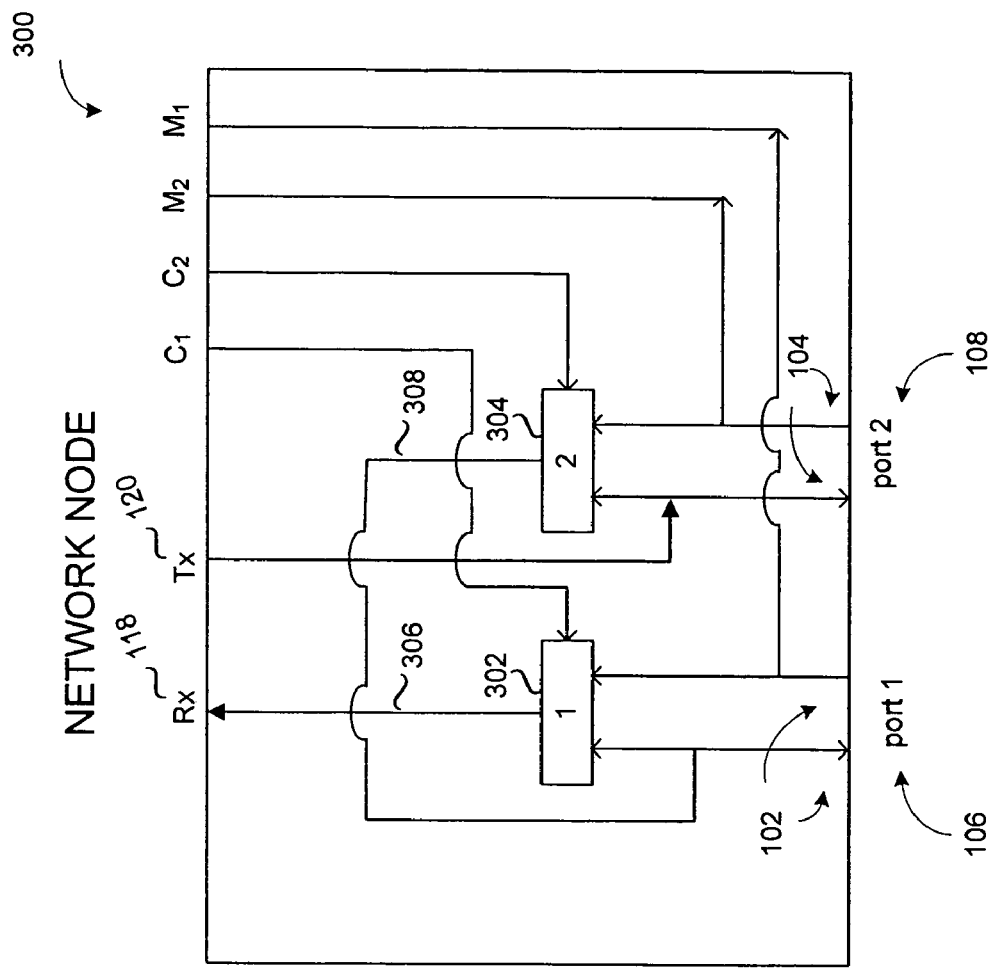
FIG. 3 is block diagram of an alternative interface adapter.

FIG. 3 illustrates an alternative interface adapter 300 that allows daisy chain architectures to emulate a ring network. Through logical connections messages may be passed from one port to another in one direction to form a ring even though nodes and interface adapters 300 may be added in series. Should a failure occur, the interface adapter 300 may bypass a failed or malfunctioning port or node by changing message routing through the interface adapter 300. The adjustment may pass messages in one of two directions that may differ with each interface adapter 300. Under the control of a peripheral device or a controller, messages may be monitored and may be routed to another port to bypass a failure until the data or message reaches its proper destination.

The interface adapter of FIG. 3 includes a first and a second physical or logical selector 302 and 304, respectively, that select and funnel one of a number of inputs 102 and 104, respectively, to a common communication link 306 or 308, respectively. Through the peripheral device or controller an input to the first and second selector 302 and 304 are monitored through monitoring lines $M_1$ and $M_2$. When a valid message or data string is detected under the control of the peripheral device or controller such as a processor, an input is passed through the first or the second selector 302 or 304. When a valid message destined for the second port 108 is received through the first port 106, the peripheral device or controller sends a signal selection signal through $C_1$, that passes the valid message to the first network input 118. The first network input 118 may examine the destination address attached to the message. The message is then passed or regenerated and passed to the second port 108 through the first network output 120 (e.g., $T_x$). When a valid message destined for the first port 106 is detected at the second port 108, the peripheral device or controller sends a selection signal through $C_2$ that passes the valid message to the first port 106 through the second selector 304.

Figure 4:
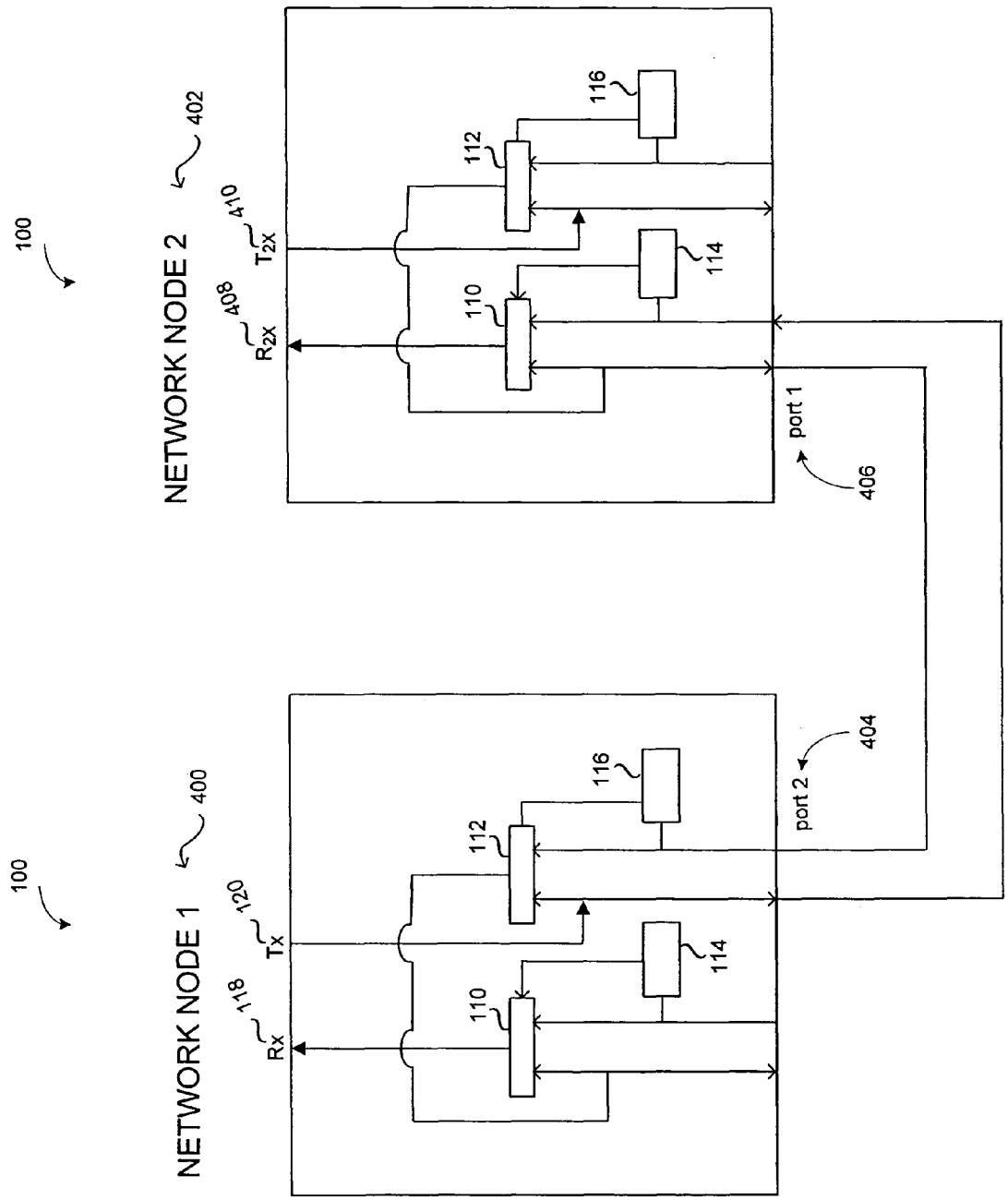
FIG. 4 is a block diagram of a two node network using the interface adapters of FIG. 1.

FIG. 4 is a block diagram of two node daisy chains using the interface adapters 100 of FIG. 1. Each interface adapter 100 includes two sets of ports that connect multiple nodes 400 and 402. Selecting devices 114 and 116 control the flow of messages through the interleaving devices or selectors 110 and 112. When messages flow from the first node 400 to the second node 402 the first network output 120 transmits a message out of the second port 404. Messages received from the second port 404 pass through the first port 406 and the first interleaving device or selector 110 of the second node 402 to the second network input 408 (e.g., $R_{2x}$). When the second node 402 receives the message, it examines the destination address attached to the message. If the address is the same as the second node's address, the second node 402 accepts it; otherwise, it passes the message or regenerates and passes the message back to the first node 400. When messages flow from the second node 402 to the first node 400 a selection signal from the second detecting device 116 of the second node 402 allows the second network output 410 (e.g., $T_{2x}$) to pass through the second interleaving device or selector 112 of the second node 402 to the second port 404 of the first node 400. Selection signals from the first and second detecting devices 114 and 116 of the first node 400 allow the second network output 406 or 410 to pass through the first and second interleaving devices or selectors 110 and 112 of the first node 400 into the first network input 118 of the first node 400.

Figure 5:
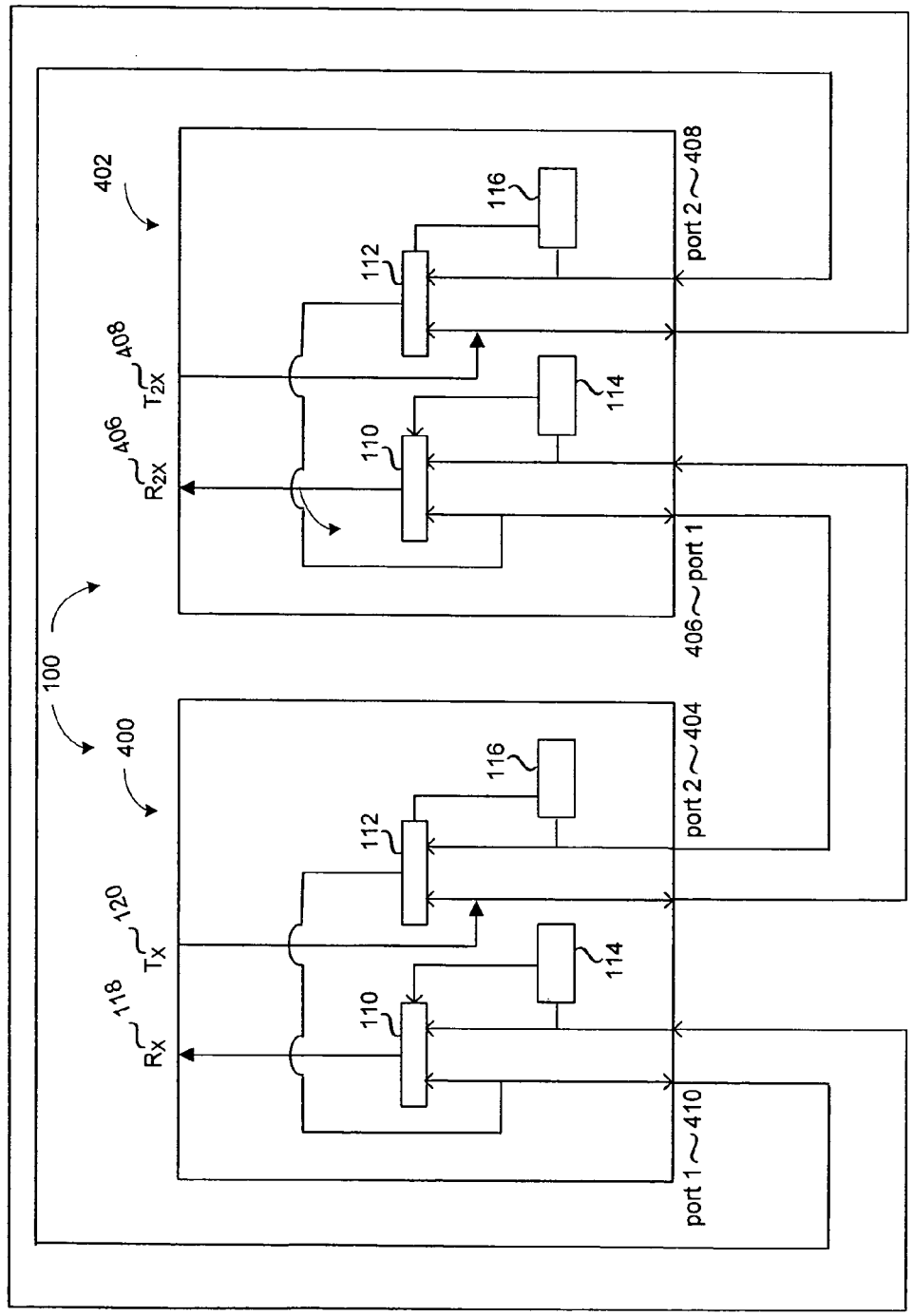
FIG. 5 is a block diagram of multiple interface adapters with a redundant link.

To minimize network failure, redundant communication links may be used to bypass malfunctioning nodes, ports, and links. The addition of a feedback loop may also be used to reduce propagation delays. In FIG. 5 the addition of the feedback loop allows the interface adapters 100 to route messages between two or more nodes through more than one communication path. When the network comprises more than two nodes, a redundant communication link may allow the interface adapter to bypass a failed or malfunctioning node without pulling the node out of network. In some networks, the redundant communication link may bypass a failed or malfunctioning node without re-programming the network or interface adapters by changing the direction that a message travels. In these networks, network damage (e.g., a broken cable, a damage node) may not interrupt information flow.

Figure 6:
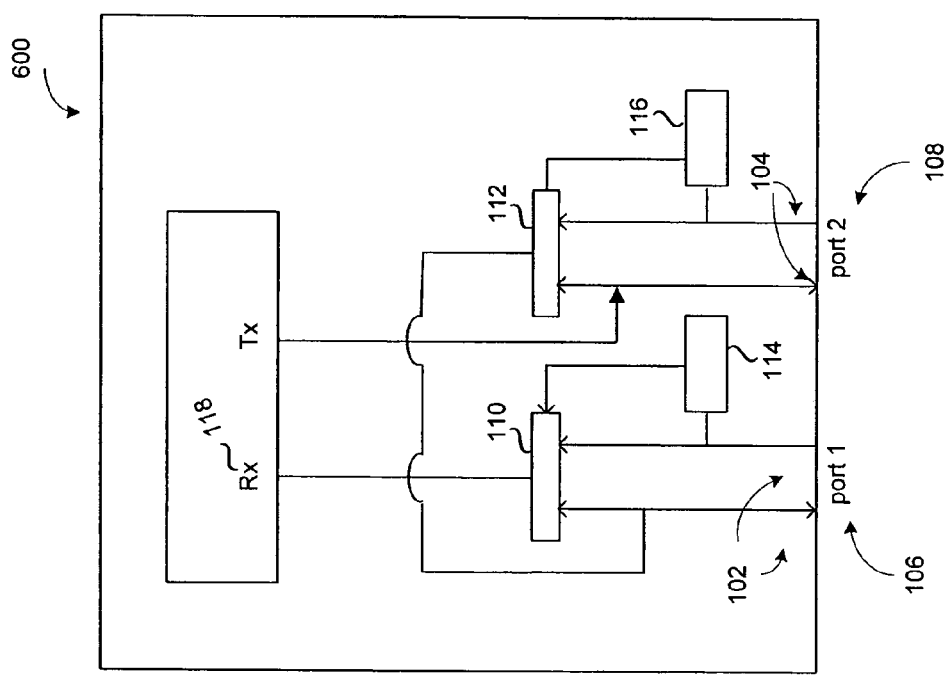
FIG. 6 is a block diagram of an interface adapter integrated with a network interface.

FIG. 6 is a block diagram of an alternative interface adapter 600 that is a unitary part of devices (nodes) that are to be connected in series but emulate a closed loop, or ring. The interface adapter 600 may include intelligence such as logic (e.g., software or firmware) or a processor and a memory such as a buffer. The first and second detecting devices 114 and 116 of the interface adapter 600 and those shown in FIGS. 1, 2, and 4-6 may comprise plug and play logic or hardware that senses a node's position in a daisy chain (e.g., first, last, or intermediate; or single port or multiple ports) and adjusts message routing. When the detecting devices or logic 114 and 116 detect a one port connection, the first detecting device or logic 114 adjusts its routing such that input to the first node passes through the first interleaving device or selector 110 to the first network input 118. When no devices are connected to the second port 108, the second detecting devices and logic 116 adjust its routing such that the output of the first node passes through the second interleaving device or selector 112 and out through the first port 106.

Figure 7:
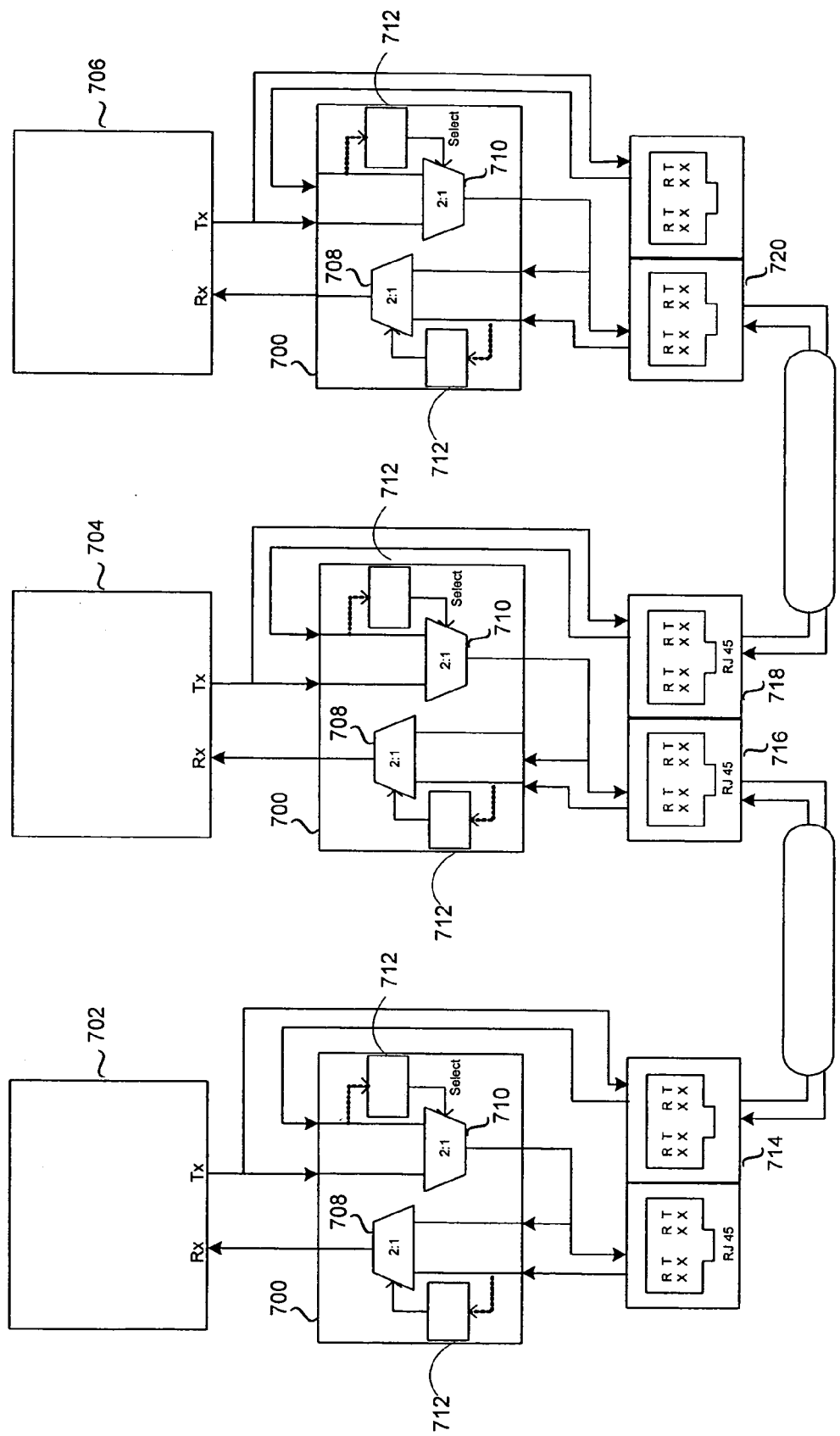
FIG. 7 is block diagram of a three node network.

FIG. 7 is block diagram of a three node daisy chain coupled through alternative interface adapters 700. Each node 702, 704, and 706 is coupled to two 2-to-1 multiplexers 708 or 710 that are coupled to presence detect circuits 712, respectively. In some networks the multiplexers 708 and 710 and presence detect circuits 712 eliminates the need to physically connect the output port of the last node (706 in FIG. 7) to the input port of the first node (702 in FIG. 7) in a ring network. The presence detect circuits 712 may detect if a node is physically the first node, an intermediate node, or the last node and, based on that detection, activates the multiplexers 708 and 710 to complete the communication ring even when a network is implemented as a daisy chain or series of nodes.

In FIG. 7 plug and play circuitry within the presence detect circuit 712 may sense node position (e.g., the first, intermediate, or last node), and accordingly adjust message routing. For instance, if a presence detect circuit 712 senses a one port connection at its second port (e.g., a first node 702 in FIG. 7), it adjusts its internal routing such that its input comes from the $R_x$ pins of the output port of a first connector (714 in FIG. 7) (e.g., such as an RJ-45 connector). If the presence detect circuit 712 senses a one port connection at the first port (e.g., a last node 706 in FIG. 7) in a daisy chain, it adjusts its internal routing such that its output data are returned upstream through the $T_x$ pins of its input port of a last connector (720 in FIG. 7).

Figure 8:
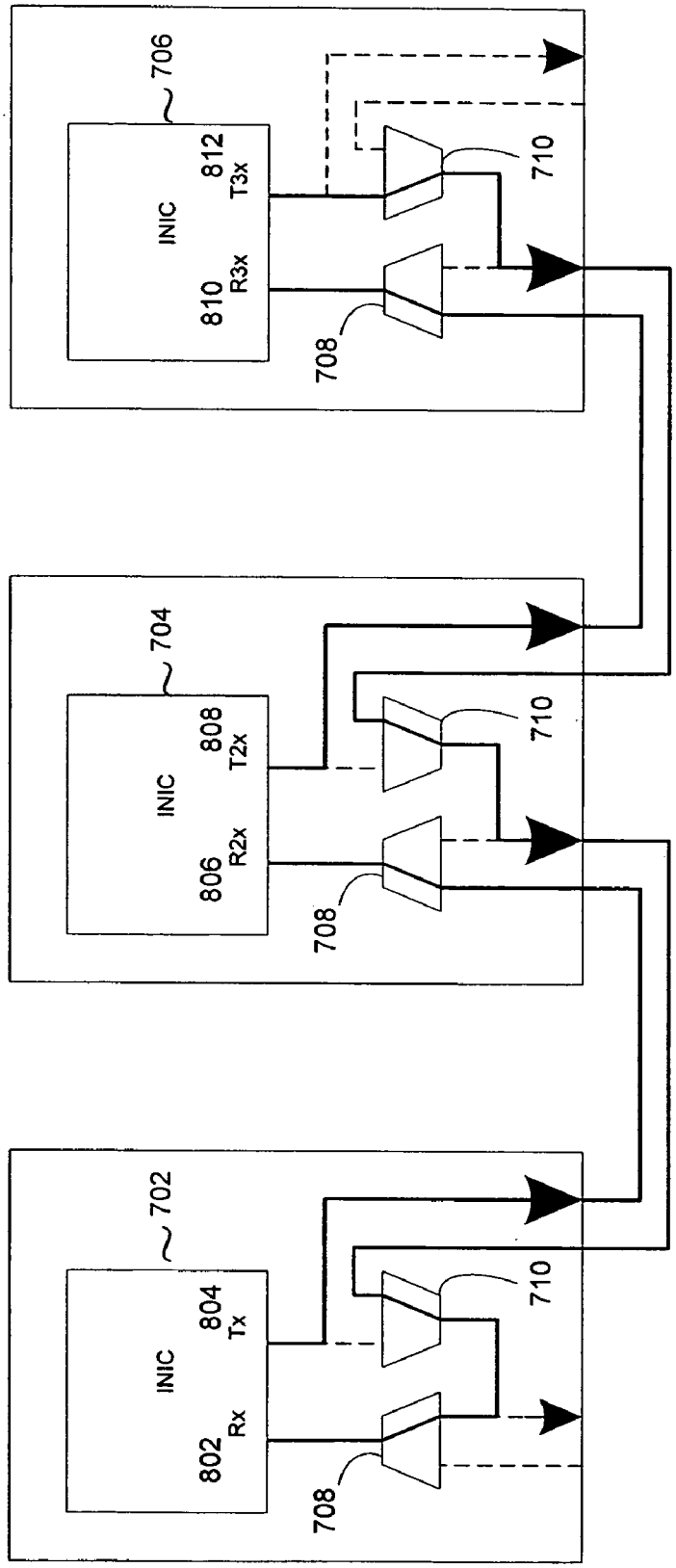
FIG. 8 is a block diagram of data flow through the three node network of FIG. 7.

As shown in the three node daisy-chain network of FIG. 8 (presence detect circuits 712 not shown), messages received at the first node 702 pass through the first and second multiplexers 708 and 710 of the first node 702 and into a first node input $R_x$ 802. With no devices connected to the first port, messages are transmitted from the first node output $T_x$ 804 to the intermediate node 704. Messages received from the first node 702 pass through the first multiplexer 708 of the second node 704 into the second node input $R_{2x}$ 806. When the second node 704 receives the message, it examines the destination address attached to the message. If the address is the same as the second node's address it accepts the message and release the network communication link or bus; otherwise, it passes or regenerates the message and passes the message to the third or last node 706. Messages transmitted out of the second node output $T_{2x}$ 808 pass through the first multiplexer 708 of the third node 706 and into a third node input $R_{3x}$ 810. When the third node 706 receives the message, it examines the destination address attached to the message. If the address is the same as the third node's address it accepts the message and releases the network communication link or bus; otherwise, it passes or regenerates the message and passes the message to the first node 702 through the second multiplexer 710 of the third node 706, the second multiplexer 710 of the second node 704 and the first and second multiplexers 708 and 710 of the first node 702.

Figure 9:
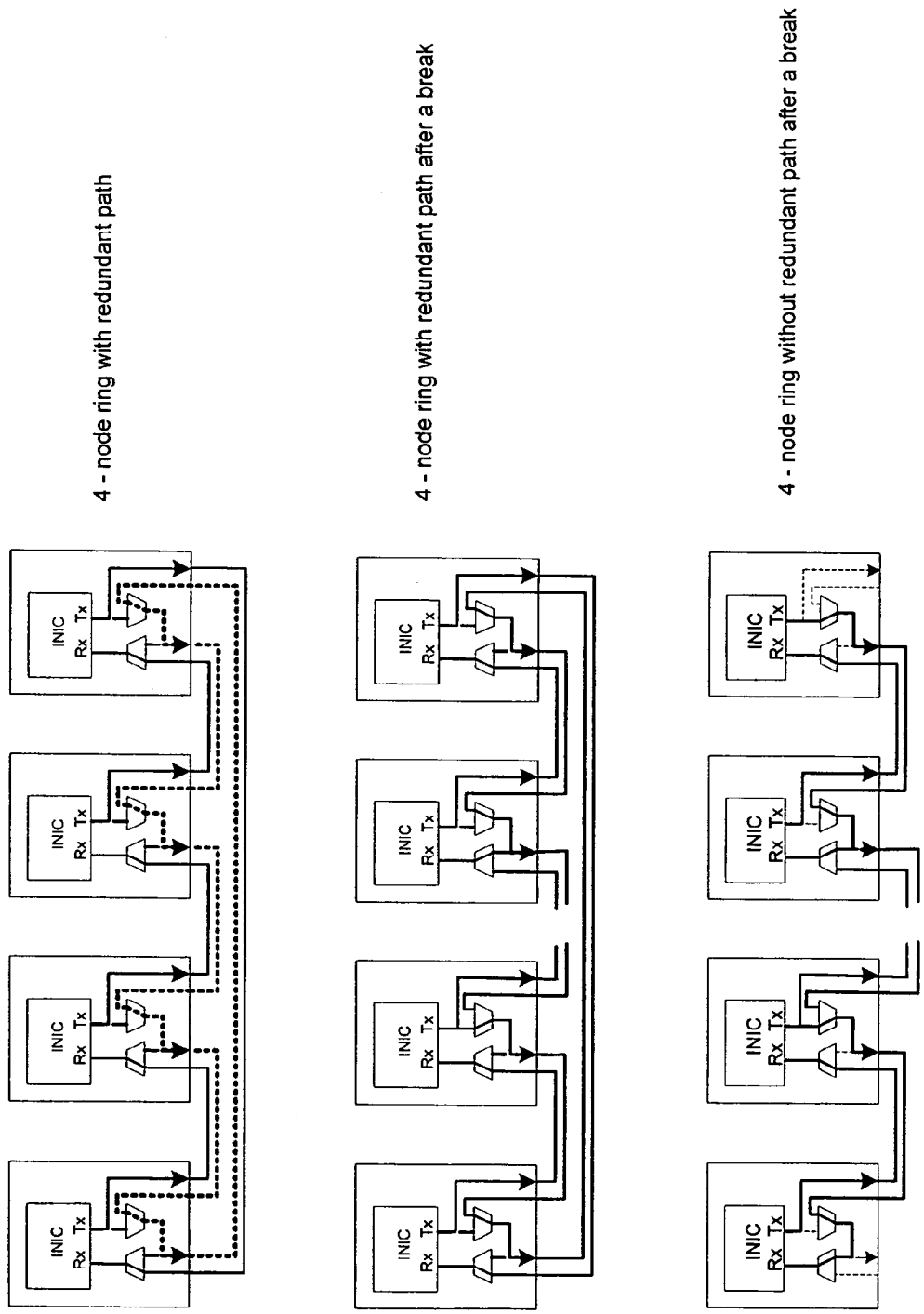
FIG. 9 are block diagrams of data flow through a four node network and a four node network with a redundant link after a break in a communication link.

FIG. 9 illustrates how data may flow in a four node network with or without a redundant communication link after a communication link failure. Since each interface adapter is connected to separate nodes; the ports may communicate with other nodes when failures occur by switching direction of message travel in some or all of the communication paths.

The interface adapters described above are adaptable to many technologies or devices including devices or structures for transporting people or things such as vehicles, consumer or professional audio platforms, and other technologies and devices that convey data or information from one node to another including local area networks, wide area networks, baseband networks, and broadband networks that may convey electrical or optical data. Some circuits and logic may also include one or a combination of filters, termination networks, and adaptive equalizations. Some interface adapters match the passive and/or complex impedances that convey the message, data, or signals to the impedance of the input port or an intermediate element. The interface adapters may include circuits that pass signals within a certain frequency range or band (e.g., such as about 25 MHz to about 375 MHz) but block or attenuate signals both above and below the band such as a bandpass filter. Some interface adapters may include a termination network that matches the impedance of an input and/or equalization that compensates for frequency dependent losses inherent within the communication channel, link, or bus. The interface adapter may be embodied in any device that transmit and receive data or messages.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. An interface adapter of a network node and a ring based network, the interface adapter comprising:
   a first plurality of ports comprising a dedicated input port and a bidirectional input and output port;
   a first circuit that selects a first input received at the first plurality of ports and switches the first input to a first common communication line;
   a second plurality of ports comprising a dedicated input port and a bidirectional input and output port;
   a second circuit that selects a second input, the second input received at the second plurality of ports, and switches the second input to a second common communication line coupled to the bidirectional input and output port of the first plurality of ports; and
   a detect circuit that detects a relative position of the interface adapter in the network and controls the first circuit and the second circuit to emulate a communication ring in which nodes are connected in series in a communication loop.

2. The interface adapter of claim 1 where the detect circuit comprises plug and play logic.

3. The interface adapter of claim 1 where the first circuit and the second circuit are configured to transmit a message with a destination address.

4. The interface adapter of claim 1 where the detect circuit comprises a first detect device and a second detect device, where the second detect device is coupled with the second plurality of ports.

5. The interface adapter of claim 4 where the first detect device is coupled to an output of a second interface adapter.

6. The interface adapter of claim 1 where the first circuit comprises a first selection device and the second circuit comprises a second selection device.

7. The interface adapter of claim 1 where the detect circuit is configured to monitor a communication link and bypass a failed node.

8. The interface adapter of claim 1 where the detect circuit comprises a unitary part of the second circuit.

9. The interface adapter of claim 1 where the detect circuit is configured to monitor continuity through a portion of the communication loop.

10. A series network having a plurality of interface adapters, the series network comprising:
   a first node coupled to a first interface adapter comprising a dedicated input port and a bidirectional input output port that can transfer signals in both directions directly between a plurality of devices, and
   a second node coupled to a second interface adapter, the second interface adapter connected in series with the dedicated input port and the bidirectional input output port of the first interface adapter,
   where the first interface adapter is configured to automatically detect that the first interface adapter is connected to a single adjacent interface adapter when no fault exists in the series network and route a message to a third interface adapter in the series network, and where the plurality of interface adapters emulate a communication ring in which the plurality of interface adapters are connected in series in a communication loop.

11. The series network of claim 10 where the series network comprises a local area network.

12. The series network of claim 10 where the first node is coupled to a vehicle.

13. The series network of claim 10 where the first interface adapter comprises a first interleaving device that selects one of a first number of inputs received at the first plurality of ports and switches a first input to a first common communication line.

14. The series network of claim 13 where the second interface adapter comprises a second interleaving device that selects one of a second number of inputs received at the second plurality of ports and switches a second input to a second common communication line coupled to one of the first number of inputs.

15. The series network of claim 14 where the second interface adapter further comprises a presence detect circuit coupled to the second interleaving device, the presence detect circuit configured to detect when the second interface adapter is connected to a single adjacent interface adapter when no fault exists and to route a message to another interface adapter in the series network through the single adjacent interface adapter.

16. The series network of claim 13 where the first interface adapter further comprises a presence detect circuit coupled to the first interleaving device, the presence detect circuit configured to detect when the first interface adapter is connected to a single adjacent interface adapter when no fault exists and to route a message to another interface adapter in the series network through the single adjacent interface adapter.

17. The series network of claim 13 further comprising a first impedance matching filter coupled to an input of the first interface adapter, and a second impedance matching filter coupled to an input of the second interface adapter.

18. The series network of claim 17 further comprising a first adaptive equalization device coupled to an input of the first interface adapter, and a second adaptive equalization device coupled to an input of the second interface adapter, where the first adaptive equalization device compensates for frequency dependent loses, and the second adaptive equalization device compensates for frequency dependent loses.

19. The series network of claim 10 where the first node is coupled to an audio platform.

20. An interface adapter of a network node and a ring based network, the interface adapter comprising:
   a first plurality of ports comprising a dedicated input port and a bidirectional input and output port;
   a first circuit that selects a first input received at the first plurality of ports and switches the first input to a first common communication line;
   a second plurality of ports comprising a dedicated input port and a bidirectional input and output port;
   a second circuit that selects a second input, the second input received at the second plurality of ports, and switches the second input to a second common communication line continuously coupled to the bidirectional input and output port of the first plurality of ports; and
   a detect circuit that detects a relative position of the interface adapter in the network and controls the first circuit and the second circuit to emulate a communication ring in which nodes are connected in series in a communication loop.

* * * * *